United States Patent
Moore, III

(12) 
(10) Patent No.: US 6,654,407 B2
(45) Date of Patent: Nov. 25, 2003

(54) NOISE SHAPING TECHNIQUE FOR SPREAD SPECTRUM COMMUNICATIONS

(75) Inventor: Timothy F. Moore, III, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 146 days.

(21) Appl. No.: 10/029,707

(22) Filed: Dec. 21, 2001

(65) Prior Publication Data

US 2002/0048314 A1 Apr. 25, 2002

Related U.S. Application Data

(63) Continuation of application No. 09/679,773, filed on Oct. 5, 2000, which is a continuation of application No. 09/192,703, filed on Nov. 16, 1998, now Pat. No. 6,148,021, which is a continuation of application No. 08/910,069, filed on Aug. 12, 1997, now Pat. No. 5,838,719, which is a continuation of application No. 08/542,306, filed on Oct. 12, 1995, now abandoned, which is a continuation of application No. 08/146,650, filed on Nov. 2, 1993, now Pat. No. 5,459,758.

(51) Int. Cl.[7] .............................................. H04L 27/30
(52) U.S. Cl. ....................................... 375/141; 375/146
(58) Field of Search ................................. 375/219, 265, 375/220, 222, 259, 130, 141, 133, 137; 455/39, 73, 42, 77; 370/320, 335, 342, 441

(56) References Cited

U.S. PATENT DOCUMENTS

| | | | |
|---|---|---|---|
| 4,319,358 A | * | 3/1982 | Sepp ........................ 375/145 |
| 4,346,384 A | | 8/1982 | Raab |
| 4,785,463 A | | 11/1988 | Jane et al. |
| 4,962,507 A | | 10/1990 | Renshaw |
| 4,965,853 A | | 10/1990 | Barnard |
| 5,048,052 A | | 9/1991 | Hamatsu et al. |
| 5,101,406 A | * | 3/1992 | Messenger ................... 370/349 |
| 5,101,417 A | | 3/1992 | Richley et al. |
| 5,140,610 A | * | 8/1992 | Holliday et al. ............ 375/131 |
| 5,148,452 A | | 9/1992 | Kennedy et al. |
| 5,208,829 A | | 5/1993 | Soleimani et al. |
| 5,220,557 A | * | 6/1993 | Kelley ........................ 370/345 |
| 5,241,561 A | | 8/1993 | Barnard |
| 5,245,612 A | * | 9/1993 | Kachi et al. ................. 370/324 |
| 5,260,967 A | | 11/1993 | Schilling |
| 5,297,161 A | * | 3/1994 | Ling ........................... 375/130 |
| 5,325,394 A | * | 6/1994 | Bruckert ..................... 375/148 |
| 5,341,396 A | * | 8/1994 | Higgins et al. ............. 375/130 |
| 5,351,016 A | | 9/1994 | Dent |
| 5,377,225 A | | 12/1994 | Davis |
| 5,379,320 A | * | 1/1995 | Fernandes et al. .......... 375/141 |
| 5,404,375 A | * | 4/1995 | Kroeger et al. ............. 375/142 |
| 5,410,750 A | * | 4/1995 | Cantwell et al. ............ 455/306 |
| 5,412,686 A | * | 5/1995 | Ling ........................... 375/147 |
| 5,420,883 A | * | 5/1995 | Swensen et al. ............ 375/138 |
| 5,428,610 A | * | 6/1995 | Davis .......................... 370/312 |
| 5,450,044 A | * | 9/1995 | Hulick ........................ 332/103 |
| 5,454,005 A | * | 9/1995 | O'Clock et al. ............. 375/142 |
| 5,481,257 A | * | 1/1996 | Brubaker et al. ....... 340/825.69 |
| 5,506,862 A | * | 4/1996 | McIntosh .................... 375/130 |
| 5,640,416 A | | 6/1997 | Chalmers |
| 6,148,021 A | * | 11/2000 | Moore, III .................. 375/141 |

* cited by examiner

Primary Examiner—Emmanuel Bayard
(74) Attorney, Agent, or Firm—Volpe and Koenig, P.C.

(57) ABSTRACT

A spread spectrum noise shaper uses a modulation technique to achieve a greater signal-to-noise or signal-to-interference ratio (SNR or SIR). The technique doubles the system SIR, in principle. This doubling yields a doubling in system capacity. SNR is increased by receiving the spread spectrum signal in the presence of less noise near the edge of the spread spectrum bandwidth. The technique requires only small additions to a conventional spread spectrum system, in the form of an extra modulator at the transmitter, and an extra demodulator and filter at the receiver.

11 Claims, 9 Drawing Sheets

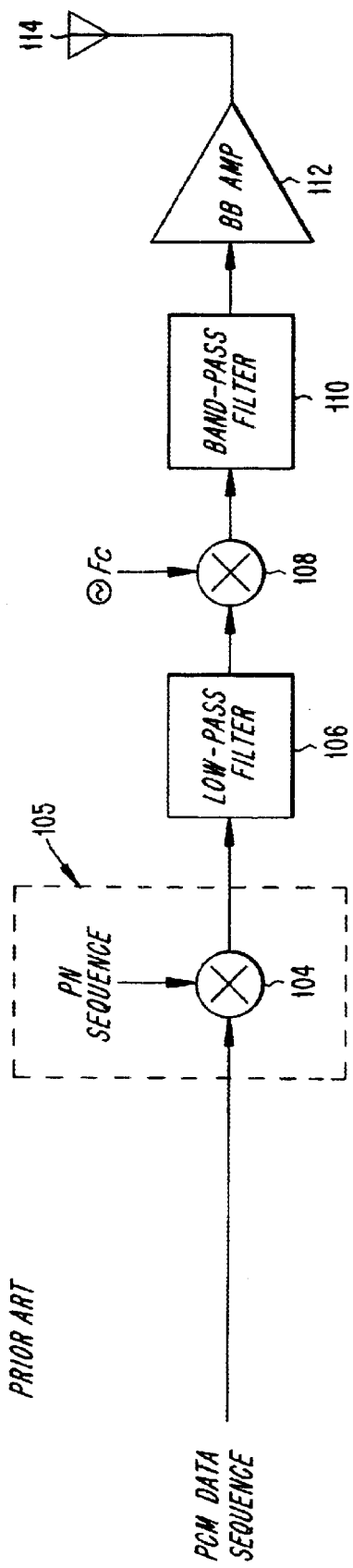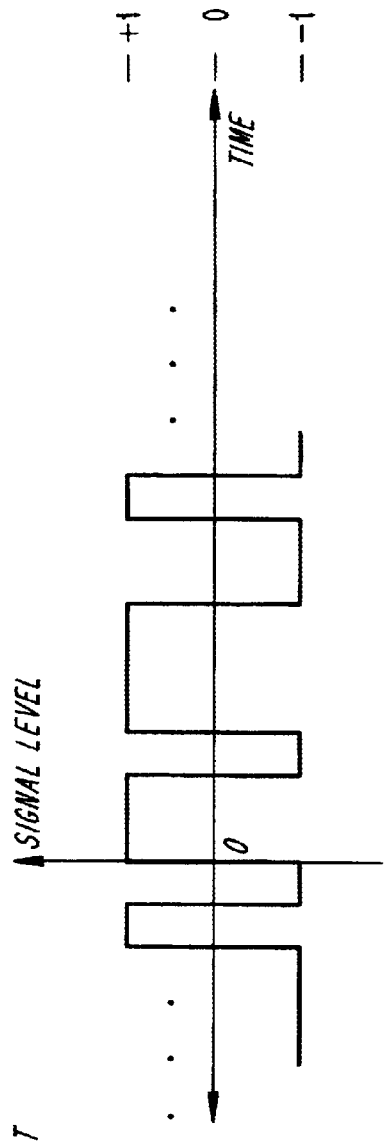
FIG. 1
PRIOR ART
FIG. 1A
PRIOR ART

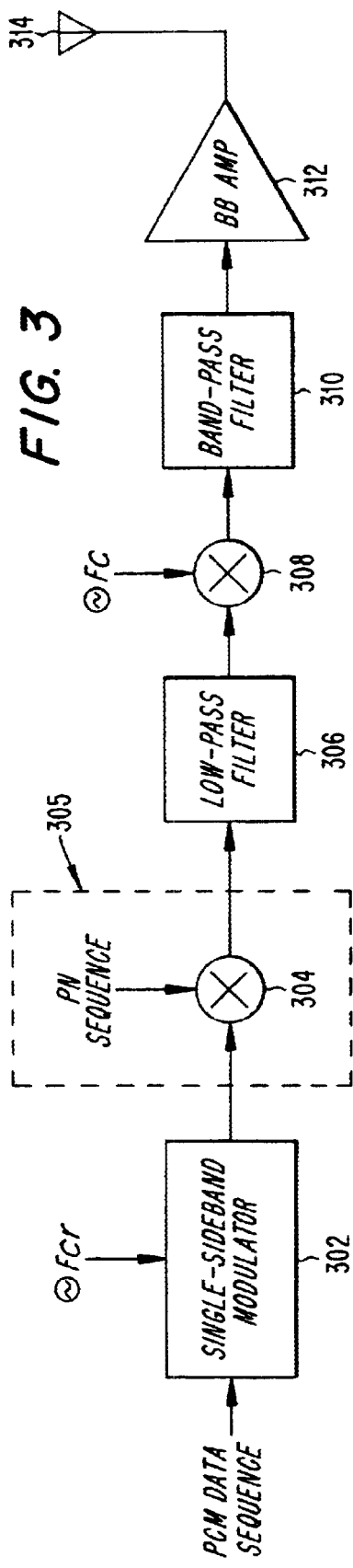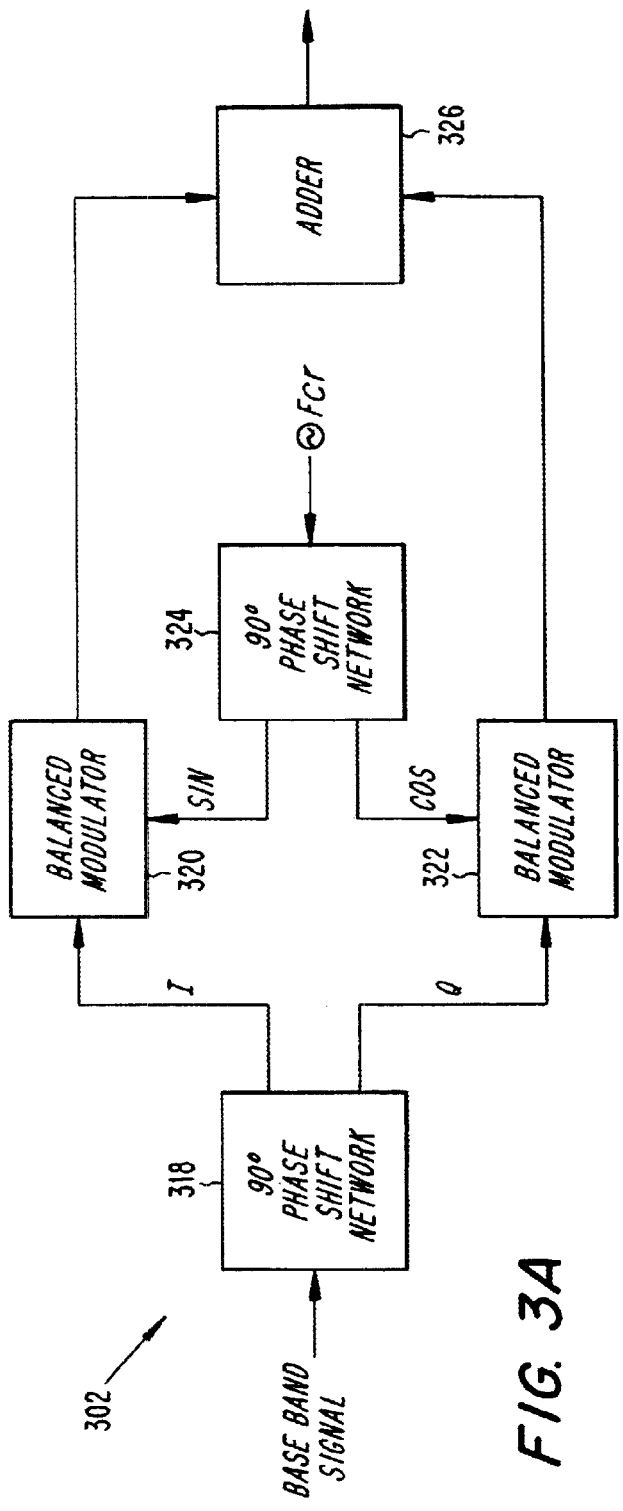

NOISE SHAPING TECHNIQUE FOR SPREAD SPECTRUM COMMUNICATIONS

REFERENCE TO OTHER APPLICATIONS

This is a continuation of U.S. patent application Ser. No. 09/679,773, which was filed on Oct. 5, 2000, which is a continuation of U.S. patent application Ser. No. 09/192,703, which was filed Nov. 16, 1998 now U.S. Pat. No. 6,148,021, which is a continuation of U.S. patent application Ser. No. 08/910,069, which was filed Aug. 12, 1997, now U.S. Pat. No. 5,838,719, which is continuation of U.S. patent application Ser. No. 08/542,306, which was filed on Oct. 12, 1995 (now abandoned), which is a continuation of U.S. patent application Ser. No. 08/146,650, which was filed on Nov. 2, 1993, now U.S. Pat. No. 5,459,758.

FIELD OF THE INVENTION

The present invention relates to the field of spread spectrum or Code Division Multiple Access (CDMA) communications.

BACKGROUND OF THE INVENTION

In any communication system, it is desirable to increase the Signal to Noise Ratio (SNR) of the system. This has the advantageous effect of increasing the fidelity of a system for transmitting an analog signal, or decreasing the bit error rate of a system for transmitting a digital signal. Prior art methods for increasing the SNR of a system focus on increasing the available signal power at the input to the receiver, or decreasing the amount of noise in the receiver. The prior art teaches several ways to increase the signal power at the receiver, for instance, one may increase the gain of the RF amplifier in the transmitter, or make antennas larger or more directive. Another way to increase the effective power at the receiver, in the prior art, is to increase the bandwidth used to transmit the signal by spectrum spreading, or less directly, by coding for error correction. Spread spectrum techniques are taught in the books *Principles of Communication Systems*, Second Edition, by Herbert Taub and Donald L. Schilling, McGraw Hill, 1986, and *Spread Spectrum Systems*, Second Edition, by Robert C. Dixon, John Wiley & Sons, 1984. One prior art technique for decreasing the amount of noise in the receiver is that of using a receiver with a low-noise amplifier at the front end of the receiver.

Spread spectrum communication systems typically operate with a very low power density spread over a wide enough bandwidth, sometimes known as the chipping bandwidth, to achieve a certain processing gain and, hence, required SNR for a given communication task. The noise in a spread spectrum system is often largely self-interference, as well as additive Gaussian white noise, which appear in the receiver as an interfering random signal having maximum power in the center of the spread spectrum bandwidth, in the portion of that bandwidth in which the desired spread spectrum signal is conventionally received. It is frequently desirable to increase the SNR in a system, especially if this can be achieved with only minimal changes to existing hardware, for instance, without changing antennas or RF amplifiers, and without significantly increasing the power or power density or occupied bandwidth of the transmitted signal. Increasing the SNR of a system significantly increases the capacity of the system. A 3 dB increase in SNR for a system allows an approximate doubling of the number of users that can be supported by the system.

SUMMARY OF THE INVENTION

The present invention is an improvement of a conventional spread spectrum communication system, having a transmitter and a receiver. It is an aspect of the present invention to increase the signal to noise ratio of a spread spectrum system by up-converting, or equivalently, frequency translating the signal, or up-shifting the spectrum of the signal to be sent, before spreading. Spreading, as used here, means spread spectrum encoding. In the present invention, the up-converted signal is transmitted and then received and then down-converted, after despreading. This has the advantageous effect of reducing the effect of self-interference and noise when the signal is received, when using a receiver according to the principles of the present invention.

In the present invention, the spectrum of the signal to be transmitted is shifted or frequency translated to the edge of the spread spectrum bandwidth, where noise in the receiver is less than in the middle of that bandwidth, prior to transmission. The signal is then received, in the signal processing sense, near the edge of the spread spectrum bandwidth, and then the spectrum of the received signal is frequency translated, or equivalently, retranslated, in the receiver. In one embodiment of the invention, these frequency translations are performed by adding a Single Sideband (SSB) modulator to the transmitter and an SSB demodulator to the receiver. This allows reception of the desired signal in a position near the edge of the chipping bandwidth that is less noisy than the position that is conventionally used for signal reception. The present invention allows reception of the same signal level as in a conventional system, in the presence of a lower level of received noise.

BRIEF DESCRIPTION OF THE DRAWINGS

FIG. 1 is a block diagram of a conventional spread spectrum transmitter;

FIG. 1A is a timing diagram of a pseudonoise (PN) sequence used in FIGS. 1, 3, 5, and 7;

FIG. 3 is a block diagram of one embodiment of the spread spectrum transmitter of the present invention;

FIG. 3A is a block diagram of the single-sideband modulator of FIG. 3;

DETAILED DESCRIPTION OF THE INVENTION

Figure 2A:
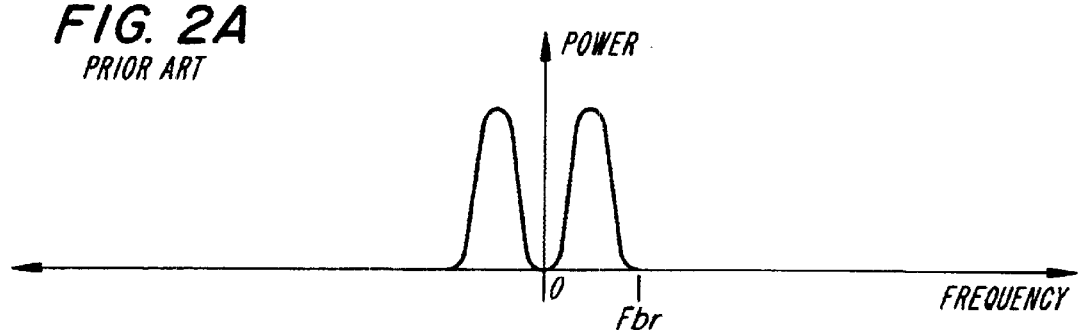
FIG. 2A is the power spectrum of the PCM data sequence of FIG. 1.

FIG. 1 shows a typical prior art spread spectrum transmitter. At the left-hand side of FIG. 1, a baseband, pulse coded modulated signal, typically a 32 kilobit per second Adaptive Pulse Code Modulated (ADPCM) speech signal, is applied to the left-hand terminal of mixer 104, which is shown contained within spread spectrum encoder 105. More information about the use and characteristics of spread spectrum encoders may be found in Taub, op. cit., pages 721–727. A pseudonoise (PN) sequence (FIG. 1A) is applied to the upper terminal of mixer 104. Mixer 104 thereby performs a frequency spectrum spreading function by multiplying the PCM data sequence by the PN sequence in the time domain, which is equivalent to convolving the bimodal spectrum of the data sequence with the approximately rectangular spectrum of the PN sequence in the frequency domain. The output of mixer 104 is applied to low-pass filter 106, whose cutoff frequency is equal to the system chip rate, Fcr. The output of filter 106 is then applied to one terminal of mixer 108 and suitably up-converted, as determined by the carrier frequency Fc, applied to its other terminal. The up-converted signal is then passed through bandpass filter 110 (typically a helical resonator), which has a bandwidth equal to twice the chip rate and a center frequency equal to the center frequency of the spread spectrum system's channel bandwidth. The output of filter 110 is applied to the input of broadband RF amplifier 112, whose output drives antenna 114.

FIG. 1A shows a conventional spreading sequence, which is a pseudo-random digital sequence, in a typical embodiment of this invention. It is conventionally shown as attaining two constant values over time, the values of +/−1. The sequence of FIG. 1A is used to spread the signal to be transmitted and to despread the received signal. Information as to the generation and use of PN sequences may be found in Taub, op. cit., pages 732–737.

Figure 2C:
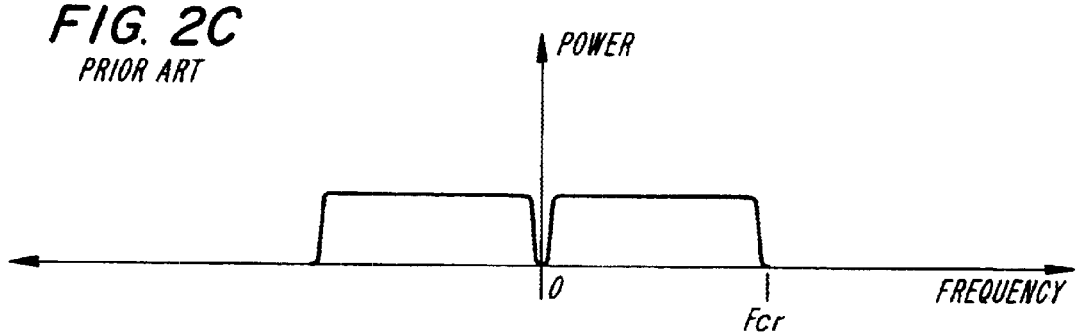
FIG. 2C is the power spectrum of the PN sequence of FIG. 1.
Figure 2D:
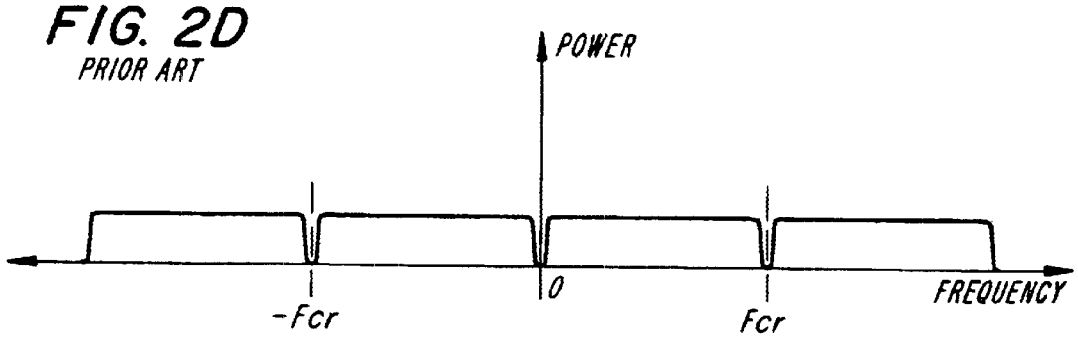
FIG. 2D is the power spectrum of the output of the spread spectrum encoder of FIG. 1.

FIGS. 2A, 2C and 2D illustrate power spectra in the prior art transmitter of FIG. 1. FIG. 2A shows the power spectrum of the PCM data sequence of FIG. 1. It is shown as essentially bandlimited to Fbr, the bit rate of the data sequence. FIG. 2C shows the power spectrum of the PN sequence used in FIG. 1. FIG. 2D shows the power spectrum of the output of mixer 104 of FIG. 1, which is up-converted and then band-pass filtered by band-pass filter 110, as indicated by the vertical lines labeled −Fcr and +Fcr of FIG. 2D.

FIG. 3 illustrates a block diagram of one embodiment of the spread spectrum transmitter of the present invention. Referring to FIG. 3, in accordance with the principles of the present invention, the baseband PCM signal of FIG. 3 is first passed through a pre-modulation stage, comprising single-sideband modulator 302. If modulator 302 were omitted, FIG. 3 would show a conventional spread spectrum transmitter of the prior art, i. e. FIG. 1. Modulator 302 is supplied with a spectrum shifting signal whose frequency determines how far apart the two halves of the bimodal data spectrum (FIG. 4A) of the data sequence are to be frequency translated or shifted. The shifted bimodal data spectra are illustrated in FIG. 4B. In one embodiment of the invention, the reference signal input to modulator 302 has a constant frequency of Fcr, typically 10 MHz. Fcr is called the chip rate of the spread spectrum communication system. The details of modulator 302 are further described below, in conjunction with FIG. 3A. The output of modulator 302 is applied to the left hand terminal of mixer 304, which is shown contained within spread spectrum encoder 305. The upper terminal of mixer 304 is supplied with a PN sequence as shown in FIG. 3. The output of mixer 304 is low-pass filtered in filter 306, which has a cutoff frequency equal to Fcr, the system chip rate. The output of filter 306 is subsequently up-converted in mixer 308, using a suitable carrier reference frequency, which is approximately the same as the carrier reference frequency in mixer 706 of FIG. 7.

FIG. 3A illustrates single-sideband modulator 302. The PCM data sequence from FIG. 3 is converted into I and Q components by phase shift network 318. The output of network 318 drives balanced modulators 320 and 322, which are respectively fed with sinusoidal and cosinusoidal carrier signals from phase shift network 324. The outputs of modulators 320 and 322 are combined by adder 326, whose output is the output of modulator 302.

Figure 4A:
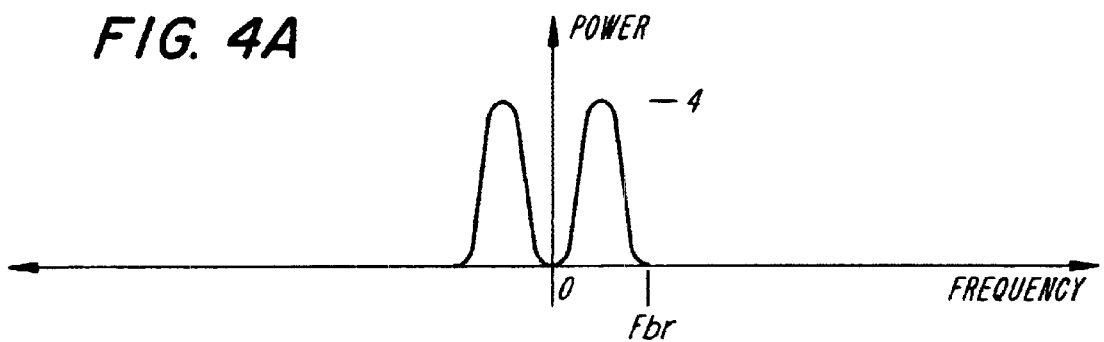
FIG. 4A is the power spectrum of the PCM data sequence of FIG. 3.
Figure 4B:
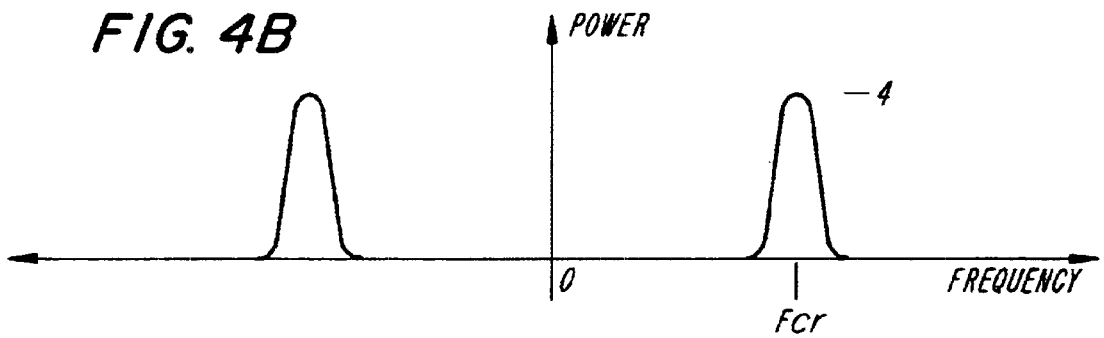
FIG. 4B is the power spectrum of the output of the SSB modulator of FIG. 3.
Figure 4C:
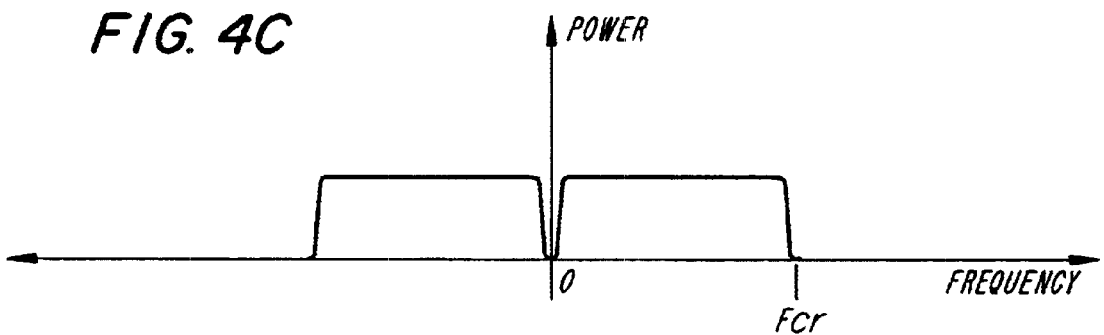
FIG. 4C is the power spectrum of the PN sequence of FIG. 3.
Figure 4D:
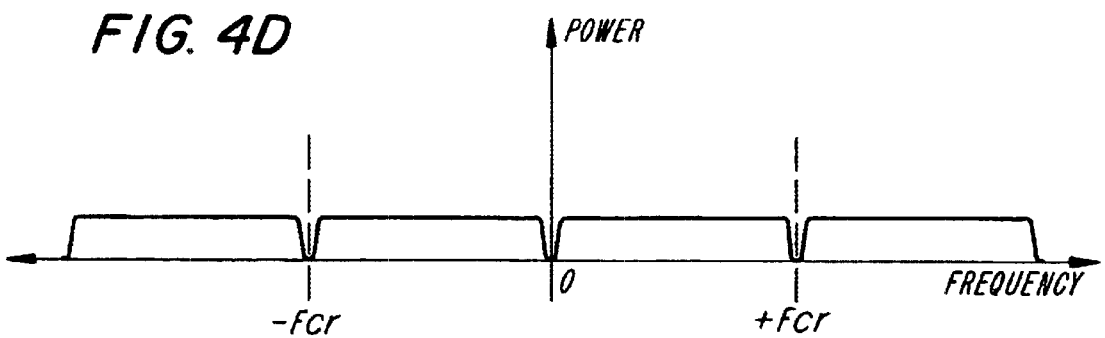
FIG. 4D is the power spectrum of the output of the spread spectrum encoder of FIG. 3.

FIGS. 4A, 4B, 4C and 4D illustrate power spectra in the transmitter of a typical embodiment of the present invention, i.e. the transmitter of FIG. 3. FIG. 4A shows the power spectrum of the PCM data sequence of FIG. 3. It is shown as essentially bandlimited to Fbr, the bit rate of the PCM data sequence. FIG. 4B shows the power spectrum of the output of SSB modulator 302 of FIG. 3. FIG. 4C shows the power spectrum of the PN sequence used in FIGS. 3 and 7. FIG. 4D shows the power spectrum of the output of mixer 304 of FIG. 3.

Figure 5:
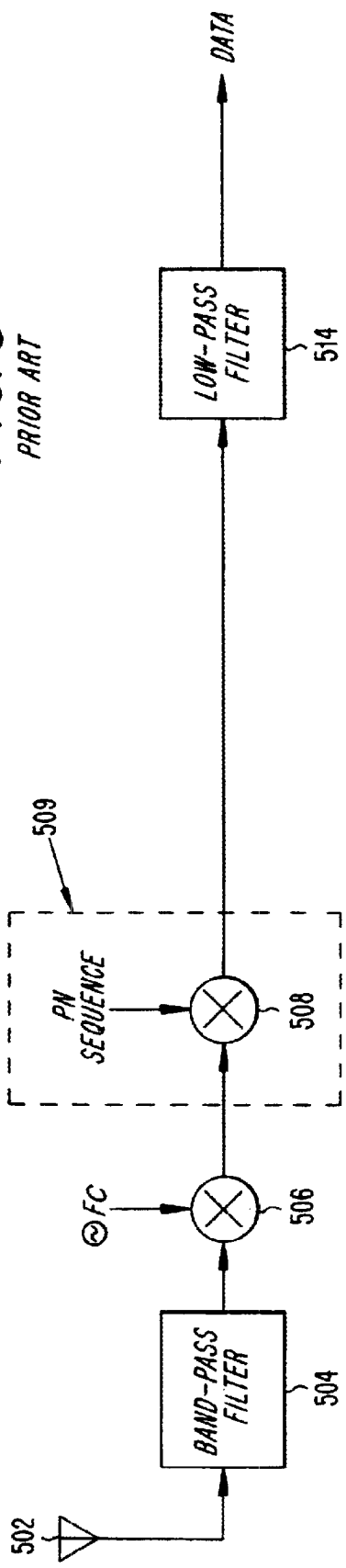
FIG. 5 is a block diagram of a conventional spread spectrum receiver.

FIG. 5 shows a conventional, or prior art spread spectrum receiver. Antenna 502 of FIG. 5 receives a spread spectrum signal, which is filtered by filter 504, which has a bandwidth equal to twice the chip rate, and a center frequency equal to the center frequency of the spread spectrum system's channel bandwidth. The output of filter 504 is subsequently down-converted by mixer 506, possibly in two stages, to a baseband signal, using a local oscillator having a constant frequency which is approximately the same as the carrier frequency Fc of FIG. 1. The output of mixer 506 is then despread, or equivalently, spread spectrum decoded, by applying it to the left hand terminal of mixer 508, while applying the PN sequence of FIG. 1A to the upper terminal of mixer 508. Mixer 508 is shown as contained within spread spectrum decoder 509 of FIG. 5. The use and characteristics of spread spectrum decoders is discussed more fully in the book by Taub. More particularly, it will be appreciated that the PN sequence used in the receiver of a spread spectrum communication system must be synchronized with the PN sequence used in the transmitter. Methods for achieving this synchronization are discussed in pages 744–748 of Taub, op. cit. The output of mixer 508 is applied to low-pass filter 514, which has a cutoff frequency at the data rate Fb of the PCM data sequence of FIG. 1. The output of filter 514 is a replica of the PCM data sequence of FIG. 1.

Figure 6A:
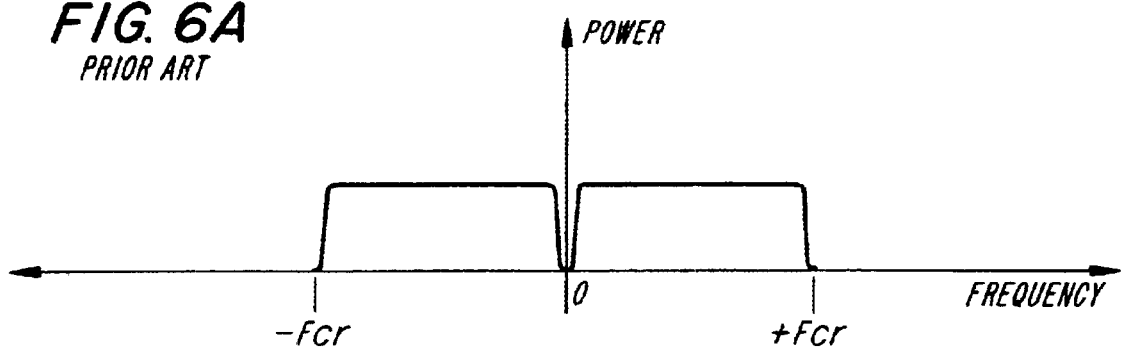
FIG. 6A is the power spectrum of the received and filtered Intermediate Frequency (IF) signal of FIG. 5.
Figure 6B:
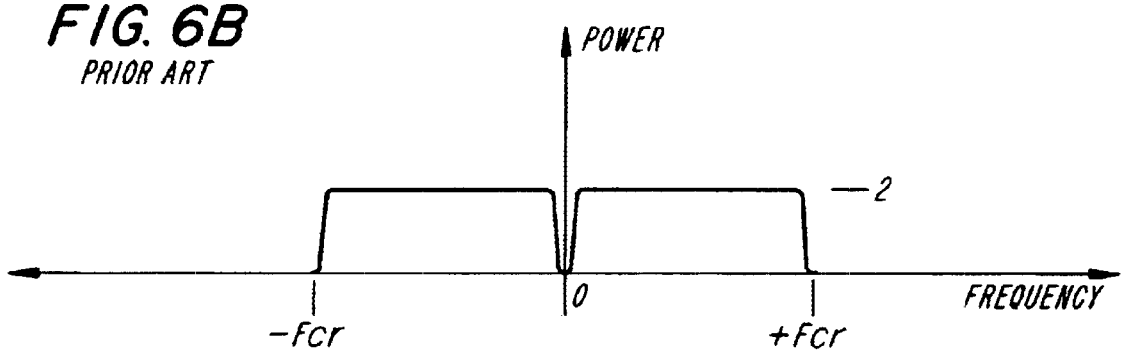
FIG. 6B is the power spectrum of the PN sequence of FIG. 5.
Figure 6C:
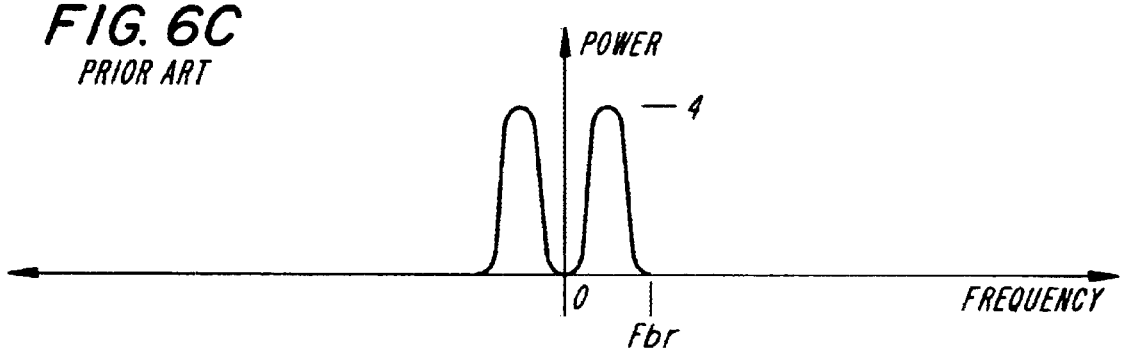
FIG. 6C is a power spectrum of the PCM data sequence component of the output of the spread spectrum decoder of FIG. 5.

FIGS. 6A, 6B, 6C, 6D, 6E and 6G show the operation of a conventional spread spectrum receiver. FIG. 6A illustrates the power spectrum of the received signal+noise, as it would be measured at the output of band-pass filter 504 of FIG. 5. FIG. 6B illustrates the power spectrum of the despreading sequence of FIG. 5. FIG. 6C illustrates the power spectrum of the PCM data sequence of FIG. 1, after it is spread spectrum decoded, i.e. despread, using the sequence of FIG. 1A.

Figure 6D:
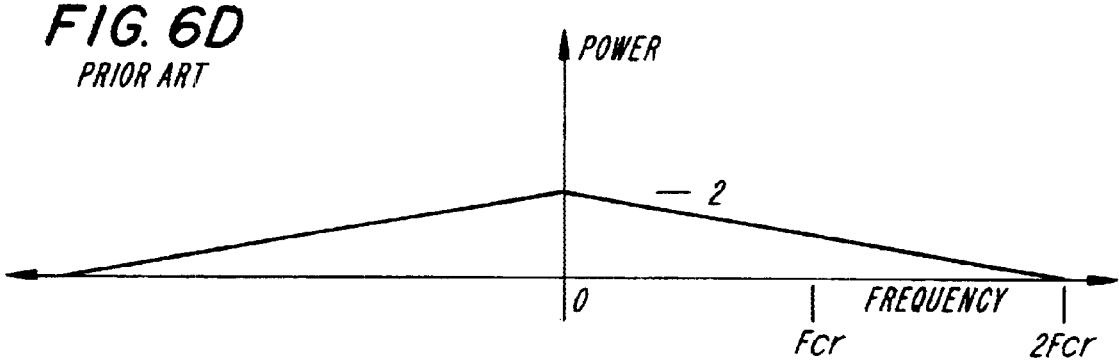
FIG. 6D is a power spectrum of the noise component of the output of the spread spectrum decoder of FIG. 5.

FIG. 6D illustrates the power spectrum of the noise component of the output of the correlator of a spread spectrum receiver, as might be measured at the output of mixer 508 of FIG. 5. The triangular shape of the noise component shown in FIG. 6D corresponds to the convolution in the frequency domain of the two approximately rectangular spectra of FIGS. 6A and 6B. It also corresponds to the multiplication of these two signals in the time domain. FIG. 6D shows that noise or self-interference that is uncorrelated with the spreading sequence used in the receiver appears in the receiver as a triangular power spectrum with a maximum magnitude at the center of the spread-spectrum bandwidth, as translated to baseband, and an amplitude of zero at twice the spread spectrum bandwidth. In a conventional spread spectrum receiver, the desired signal (as shown in FIG. 6C) is received at the center of the spread spectrum bandwidth, where the noise component (FIG. 6D) has a maximum magnitude.

Figure 6E:
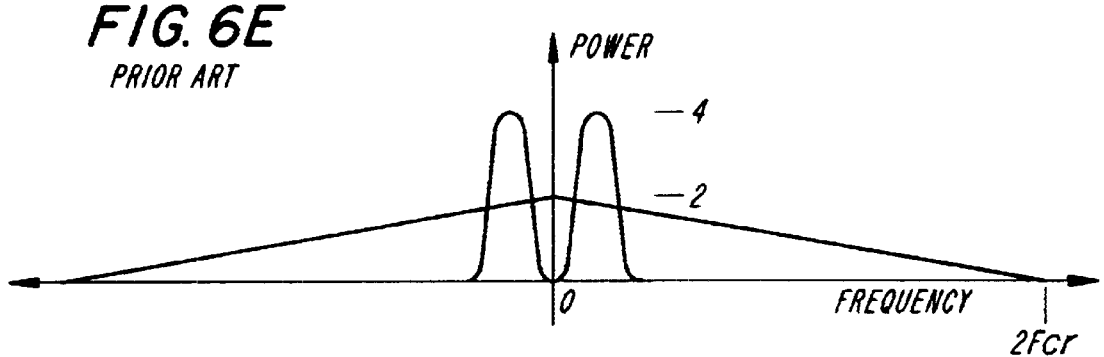
FIG. 6E is the power spectrum of the combined signal and noise outputs of the spread spectrum decoder of FIG. 5.
Figure 6G:
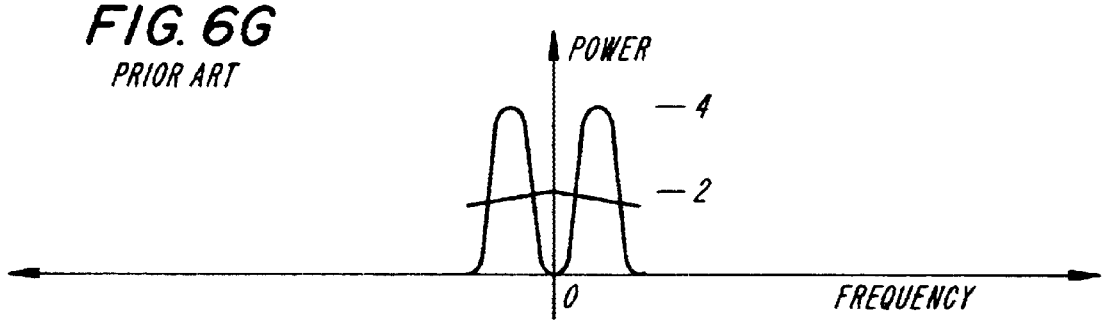
FIG. 6G is the power spectrum of the PCM output of FIG. 5.

FIG. 6E illustrates the power spectrum of the combined data sequence+noise output of mixer 508 of FIG. 5, after low-pass filtering. FIG. 6E represents the superposition of FIGS. 6C and 6D. FIG. 6G shows the result of low-pass filtering the spectrum of FIG. 6E, i.e. FIG. 6G shows the output of a conventional spread spectrum receiver/for comparison with the output of one embodiment of the receiver of the present invention.

Figure 7:
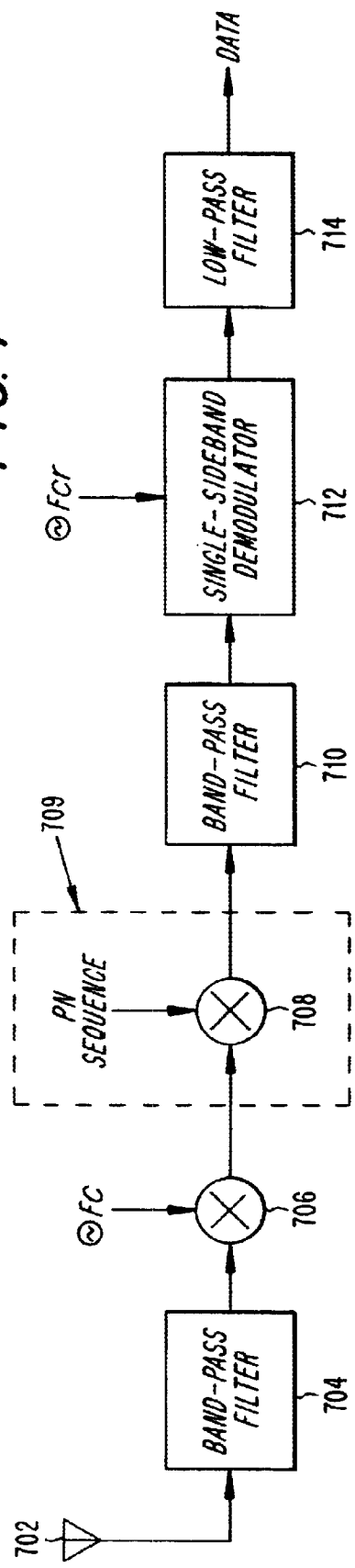
FIG. 7 is a block diagram of one embodiment of the spread spectrum receiver of the present invention.

FIG. 7 shows one embodiment of the spread spectrum receiver of the present invention. FIG. 7 differs from the conventional spread spectrum receiver of FIG. 5 in that filter 710 and SSB demodulator 712 have been added to FIG. 5 to produce FIG. 7. Antenna 702 of FIG. 7 receives a spread spectrum signal, which is filtered by filter 704, which has a bandwidth equal to twice the chip rate and a center frequency equal to the center frequency of the spread spectrum system's channel bandwidth. The output of filter 704 is then down-converted by mixer 706, possibly in two stages, to a baseband signal, using a local oscillator having a constant frequency which is approximately the same as the carrier frequency of FIG. 3. The output of mixer 706 is then despread with mixer 708, using the PN sequence of FIG. 1A. The output of mixer 708 is then filtered in band-pass filter 710, which has a bandwidth equal to the data rate and a center frequency equal to the system chip rate. The output of filter 710 undergoes single-sideband demodulation in SSB demodulator 712, using a reference signal having a constant frequency equal to the chip rate. The output of demodulator 712 is low-pass filtered in filter 714, which has a cutoff frequency at the data rate of the PCM data sequence of FIG. 3. The output of filter 714 is a replica of the PCM data sequence of FIG. 3.

Figure 8A:
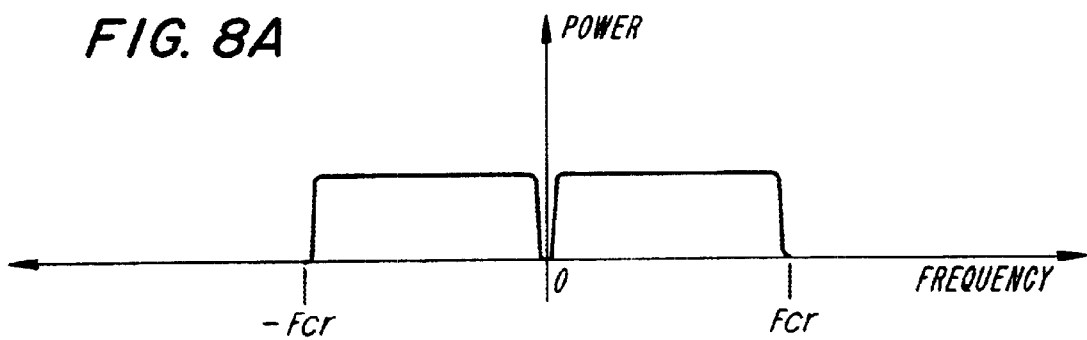
FIG. 8A is the power spectrum of the received and filtered Intermediate Frequency (IF) signal of FIG. 7.
Figure 8B:
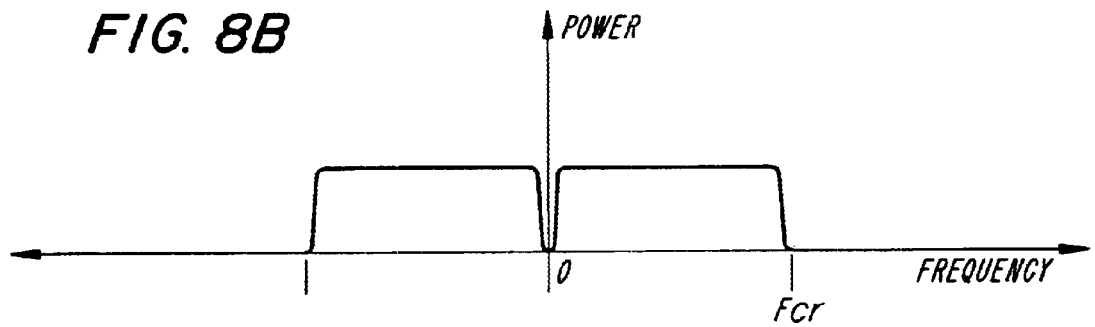
FIG. 8B is the power spectrum of the PN sequence of FIG. 7.
Figure 8C:
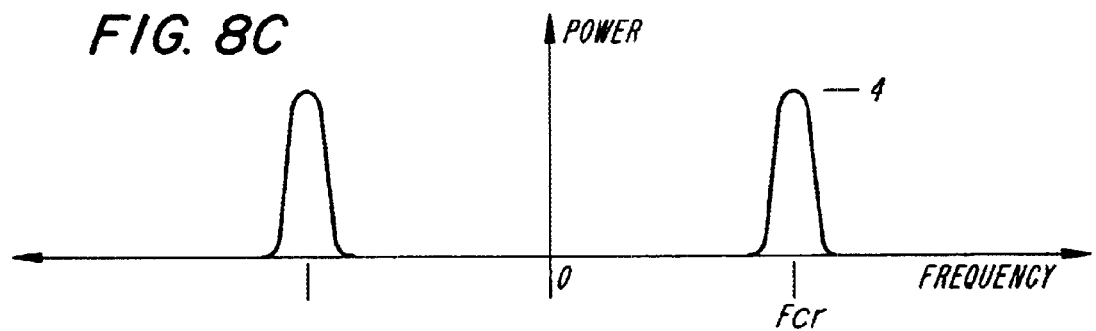
FIG. 8C is a power spectrum of the PCM data sequence component of the output of the spread spectrum decoder of FIG. 7.
Figure 8D:
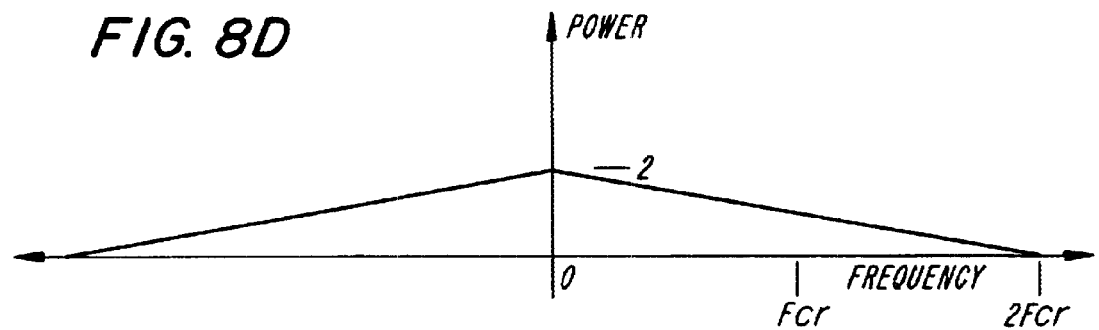
FIG. 8D is a power spectrum of the noise component of the output of the spread spectrum decoder of FIG. 7.
Figure 8E:
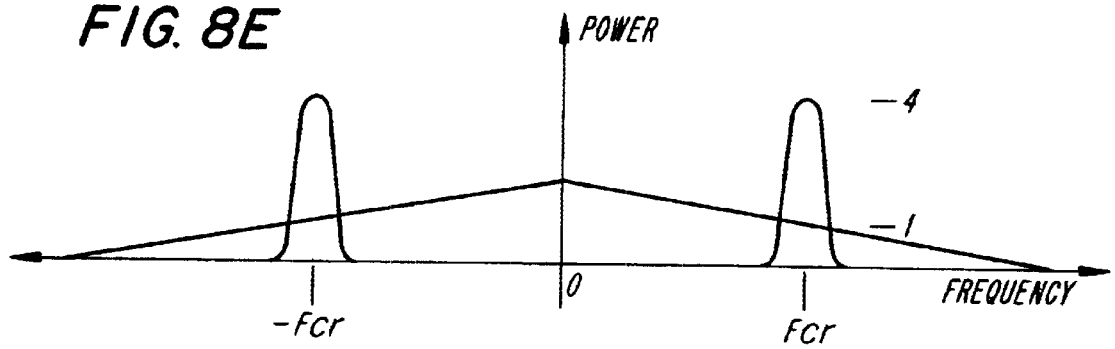
FIG. 8E is the power spectrum of the combined signal and noise outputs of the spread spectrum decoder of FIG. 7.
Figure 8F:
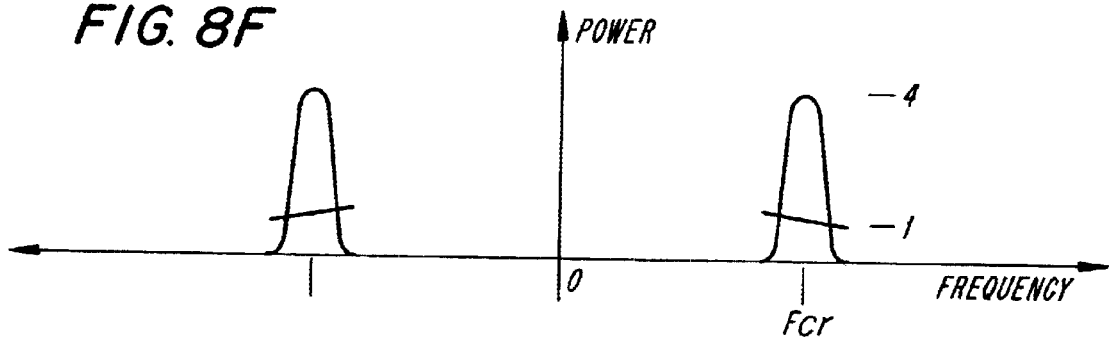
FIG. 8F is the power spectrum of the output of the intermediate band-pass filter of FIG. 7.
Figure 8G:
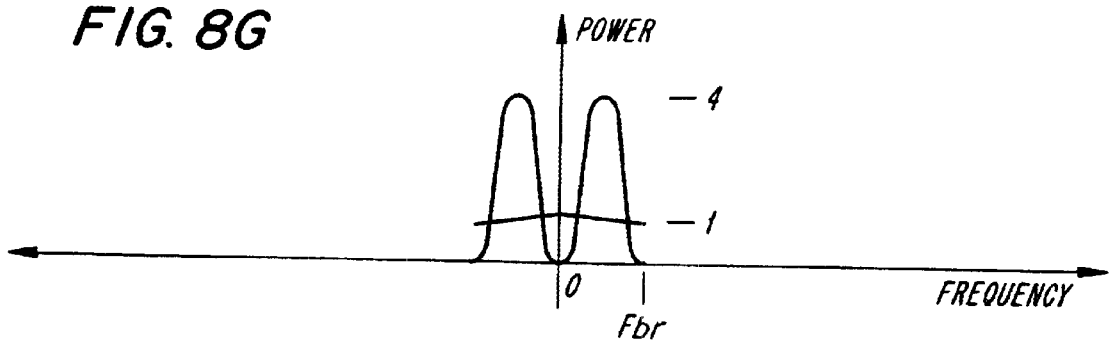
FIG. 8G is the power spectrum of the PCM output of FIG. 7.

The present invention resides in the processing steps illustrated in FIGS. 8E, 8F, and 8G. FIG. 8A illustrates the power spectrum of the received signal+noise, as it would be measured at the output of band-pass filter 704 of FIG. 7. FIG. 8B illustrates the power spectrum of the despreading sequence of FIG. 7. FIG. 8C illustrates the power spectrum of the PCM data sequence of FIG. 3, after it is spread spectrum decoded, i. e. despread, using the sequence of FIG. 1A.

FIG. 8D illustrates the power spectrum of the noise component of the output of the spread spectrum decoder or correlator of a spread spectrum receiver, as might be measured at the output of mixer 708 of FIG. 7. The triangular shape of the noise component shown in FIG. 8D corresponds to the convolution in the frequency domain of the two approximately rectangular spectra of FIGS. 8A and 8B. It also corresponds to the multiplication of these two signals in the time domain. FIG. 8D shows that noise or self-interference that is uncorrelated with the spreading sequence used in the receiver appears in the receiver as a triangular power spectrum with a maximum magnitude at the center of the spread-spectrum bandwidth, as translated to baseband, and an amplitude of zero at twice the spread spectrum bandwidth. In a conventional spread spectrum receiver, the desired signal (as shown in FIG. 6C) is received at the center of the spread spectrum bandwidth, where the noise component (FIG. 8D) has a maximum magnitude.

FIG. 8E illustrates a portion of the power spectrum of the combined data sequence+noise output of mixer 708 of FIG. 7. FIG. 8E represents the superposition of FIGS. 8C and 8D. FIG. 8E illustrates the result of mixing the sequence of FIG. 1A with the output of down converter 706, in accordance with the present invention. It will be noted that, compared to FIG. 6E, FIG. 8E shows that the two halves of the spectrum of the PCM data sequence are separated by twice the spread spectrum bandwidth. It will be further noted that the noise of FIG. 6E, representing the output of a conventional spread spectrum receiver, is at a maximum near the single copy of the data spectrum, at the center frequency, while the noise in FIG. 8E is reduced in intensity to approximately half that of the noise of FIG. 6E, in the vicinity of the data spectra.

FIG. 8F illustrates the result of band-pass filtering the spectrum illustrated in FIG. 8E, using band-pass filter 710. FIG. 8G shows the result of single-sideband demodulating the two halves of the PCM data spectrum of FIG. 8F in demodulator 712, using a reference signal having a constant frequency equal to that of the system chip rate. FIG. 8G may be used to compare the signal to noise ratio of the present invention to that of a conventional spread spectrum receiver. FIG. 6E shows an SNR of 2:1, while FIG. 8E shows an SNR of 4:1, near each half of the spectrum of the PCM data sequence. This is also the case in FIG. 8F. FIG. 8G shows that translating the two halves of the PCM data spectrum of FIG. 8F by single-sideband demodulation produces a signal amplitude of 4, as in FIG. 6E. Demodulating the two noise components of the spectra of FIG. 8F shifts those noise components to the center of the spectrum without increasing their magnitude. The amplitude of the noise component of the spectrum of the output of demodulator 712, after low-pass filtering in filter 714, is approximately 1, as illustrated in FIG. 8G. Thus FIG. 8G shows a 4:1 signal to noise ratio, using the present invention, which is a 3 dB improvement in the signal to noise ratio of the received signal, compared to the SNR of 2:1 illustrated in FIG. 6G, which corresponds to the output of a conventional spread spectrum receiver.

While the above description contains many specifics, these should not be construed as limitations on the scope of the invention, but rather as examples of several of the many possible embodiments. Many other variations are possible. For example, this method of spread spectrum modulation could be used in any medium in which spread spectrum is employed, not just radio. Digital modulation techniques may also allow the performance gain described above. One such digital technique uses a modified spreading sequence in the transmitter, in which the despreading sequence of the receiver is multiplied by a digital sinusoid (the sequence 1010101010) at the system chip rate. The receiver then despreads with the original despreading sequence, band-pass filters and coherently combines the resulting spectra, multiplying the band-passed signal by the digital sinusoid.

What is claimed is:

1. A transmitter for transmitting a spread spectrum code division multiple access (CDMA) communication signal over a carrier frequency, the signal comprising a data sequence convolved with a pseudo-noise sequence, the data sequence having a chip rate, the transmitter comprising:
    a frequency translator for translating the signal to a portion of the signal bandwidth having less than the greatest magnitude of noise;
    a spread spectrum encoder for encoding the translated signal into a spread signal;
    an antenna from which the spread signal is transmitted; and
    a power amplifier for driving the antenna.

2. The transmitter of claim 1, wherein the frequency translator comprises a single sideband modulator.

3. The transmitter of claim 1, wherein the encoder comprises a mixer for mixing the translated signal with the pseudo-noise sequence.

4. The transmitter of claim 1, wherein the translator is responsive to a reference signal having a frequency at the chip rate, further comprising:
    a low-pass filter having a cutoff frequency corresponding to the chip rate;
    a miser for up-converting said spread spectrum data signal at the carrier frequency; and
    a band-pass filter with a bandwidth corresponding to twice the chip rate for filtering the signal prior to transmission.

5. The transmitter of claim 4, wherein the band-pass filter is a helical resonator.

6. The transmitter of claim 1, wherein the spread spectrum signal is bimodal.

7. A receiver for receiving a spread spectrum code division multiple access (CDMA) communication signal with a data rate on a carrier frequency, the signal encoded with a pseudo-noise sequence, the receiver comprising:
    an antenna for receiving a single sideband modulated form of the spread spectrum signal;
    a mixer for down-converting the spread spectrum data signal at the carrier frequency;
    a spread spectrum decoder for decoding the dawn-converted signal into a decoded signal; and
    a single sideband demodulator for translating the decoded signal to a replica of the spread-spectrum signal.

8. The receiver of claim 7 wherein the decoder comprises a mixer for despreading the received spread spectrum signal with the pseudo-noise sequence.

9. The receiver of claim 7 further comprising:
    a mixer for down-converting the spread spectrum data signal at the carrier frequency prior to decoding;
    a band-pass filter having a bandwidth corresponding to the data rate;
    a low-pass filter with a cutoff frequency corresponding to the data rate.

10. A transmitter for transmitting a spread spectrum code division multiple access (CDMA) communication signal over a carrier frequency, the signal comprising noise and a data sequence convolved with a pseudo-noise sequence, the pseudo-noise sequence having a chip rate, the transmitter comprising:
    a single sideband modulator for shifting the signal responsive to a reference signal to a portion of the signal bandwidth having less than the greatest magnitude of noise;
    a spread spectrum encoder for encoding the translated signal into a spread signal;
    an antenna from which the spread signal is transmitted; and
    a power amplifier for driving the antenna.

11. The transmitter of claim 10 whereby the reference signal has a frequency that is about equal to the chip rate.

* * * * *

UNITED STATES PATENT AND TRADEMARK OFFICE
CERTIFICATE OF CORRECTION

PATENT NO. : 6,654,407 B2
DATED : November 25, 2003
INVENTOR(S) : Timothy F. Moore III It is certified that error appears in the above-identified patent and that said Letters Patent is hereby corrected as shown below:

Column 7,
Line 39, after the word "a", delete "miser" and insert therefor -- mixer --.

Column 8,
Line 11, after the word "the", delete "dawn-" and insert therefor -- down --.

Signed and Sealed this

Thirteenth Day of July, 2004

JON W. DUDAS
*Acting Director of the United States Patent and Trademark Office*